United States

[11] 3,622,222

| [72] | Inventors | Claude Edmond Remy<br>Foret de Vernon;<br>Daniel Francois Kohler, Valence; Yves Le Branchu, Foret De Vernon, all of France |
| --- | --- | --- |
| [21] | Appl. No. | 71,610 |
| [22] | Filed | Sept. 11, 1970 |
| [45] | Patented | Nov. 23, 1971 |
| [73] | Assignee | Etat Francais Delegation Ministerielle pour L'Armement<br>Paris, France |
| [32] | Priority | Sept. 11, 1969 |
| [33] | | France |
| [31] | | 6930868 |

[54] APPARATUS FOR SCANNING PHOTOGRAPHIC NEGATIVES
6 Claims, 3 Drawing Figs.

[52] U.S. Cl. .................................................. 350/7,
178/7.1, 178/7.6, 250/219 DD, 250/234, 350/285
[51] Int. Cl. ............................................. G02b 17/06
[50] Field of Search ........................................... 350/6, 7,
285; 250/219 DD, 234; 178/7.6, 7.1

[56] References Cited
UNITED STATES PATENTS

| 1,635,027 | 7/1927 | Belin ........................... | 350/285 X |
| --- | --- | --- | --- |
| 1,902,486 | 3/1933 | Butler et al. .................. | 250/219 DD |
| 3,346,739 | 10/1967 | Jenkner ........................ | 350/6 X |
| 3,381,570 | 5/1968 | Anway et al. ................. | 350/285 X |
| 3,548,192 | 12/1970 | Farmer et al. ................. | 350/7 X |

FOREIGN PATENTS

| 735,197 | 8/1932 | France ......................... | 178/7.6 |

*Primary Examiner*—David Schonberg
*Assistant Examiner*—John W. Leonard
*Attorney*—Waters, Roditi, Schwartz & Nissen ABSTRACT: A photographic negative is scanned by coiling the negative on a transparent sleeve and illuminating the negative from within the sleeve by focusing light rays on a rotatable mirror within the sleeve and inclined at an angle of 45° relative to the axis of the sleeve. After the completion of each rotation of the mirror the sleeve is axially displaced for illumination of the next line of the negative.

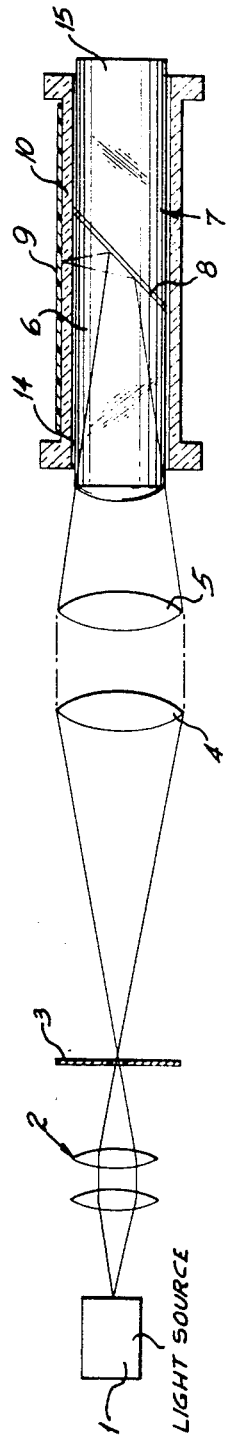
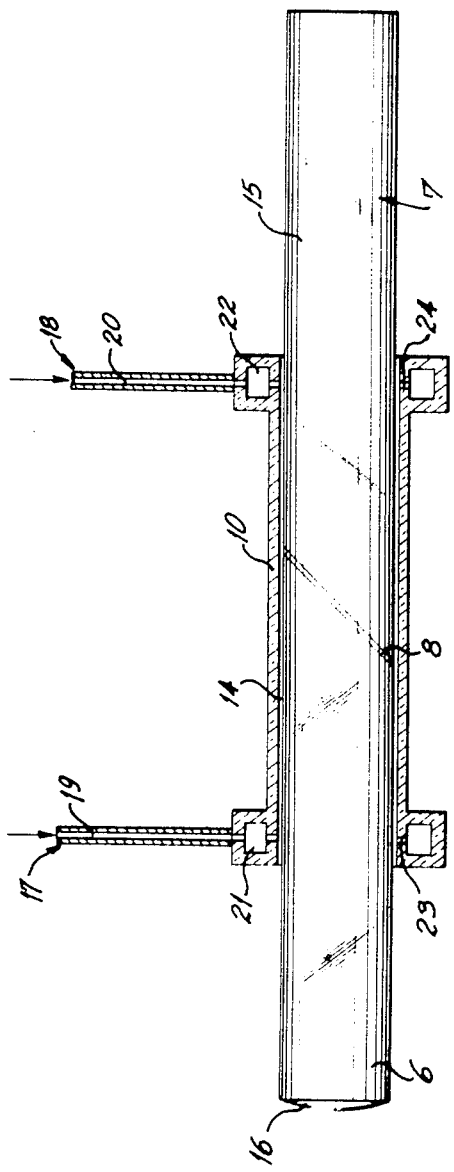
FIG. 1
FIG. 2

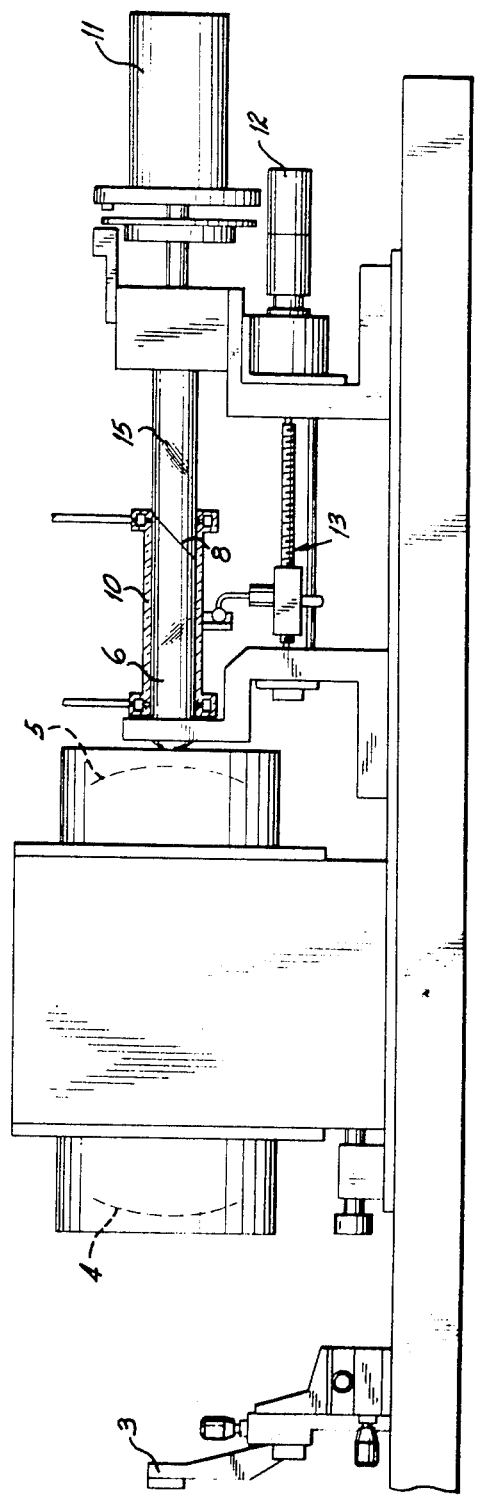

APPARATUS FOR SCANNING PHOTOGRAPHIC NEGATIVES

BRIEF SUMMARY OF THE INVENTION

The present invention relates to a scanning system for the analysis or reconstruction of high-resolution photographic negatives. The scanning system is based on the principle of a revolving plane mirror.

The mirror is mounted at an angle of 45° within a cylindrical drum whose front portion is transparent, the drum rotating around its axis of revolution. Light rays are focused on the mirror which describes a circle in the course of its rotation. A negative, wound on a glass sleeve coaxial with the drum and the sleeve is driven with periodic translatory movement parallel to the axis to analyze the negative line by line.

The invention also contemplates a method of scanning lines on a negative comprising coiling the negative in the form of a tube, and scanning the negative by illuminating the same from within along circular arcs and shifting the illumination from line to line after successive traversals of circular arcs.

BRIEF DESCRIPTION OF THE DRAWING

FIG. 1 is a diagrammatic side elevation of scanning apparatus according to the invention, FIG. 2 is a portion of the scanning apparatus in enlarged scale, and FIG. 3 is a side elevation of the scanning apparatus in greater detail.

DETAILED DESCRIPTION

Referring to FIG. 1 of the drawing, therein is seen a light source 1 and an optical system 2 positioned on the axis of the light source 1 for focusing the light rays from the source in the plane of a diaphragm 3. The light rays travel from the diaphragm 3 through two objective lens 4, and 5 and through a transparent front portion 6 of a rotatable drum 7. Mounted at the rear face of portion 6 is a plane mirror 8 inclined at an angle of 45° with respect to the optical axis. Light rays striking the mirror 8 are reflected radially and produce a spot of illumination on a negative 9 coiled on a transparent sleeve 10. The drum 7 is driven in rotation about its axis of revolution by a motor 11 (FIG. 3) and the illumination spot describes a circular path on the negative 9. The sleeve 10 is driven by motor 12 and drive mechanism 13 (FIG. 3) axially one step for each 360° of rotation of the drum 7 so that the negative 9 is analyzed line by line.

The light illuminating the negative passes to an optical system (not shown) and from there to a photomultiplier (also not shown).

The source of light 1 must be of fairly high luminance and an arc light could be used or a laser whose intensity is stabilized to give a high signal-to-noise ratio at its output. In the reconstruction of negatives, the source must be modulable up to high frequencies.

The optical system 2 focuses the light from the source in the plane of diaphragm 3 of very small diameter of the order of only a few microns. The objective lenses 4 and 5 are coupled together and identical and have high resolution on the axis to allow focusing of the scanning spot on the negative 9 after reflection by the plane mirror 8.

The light beam issuing from the two objectives 4 and 5 passes the front of the drum 7 along a spherical dioptric path. The light beam passage takes place as though the scanning spot were formed, without the presence of a mirror, at the center of the spherical dioptric which possesses excellent optical properties, especially the property of precise stigmatism.

The beam of light, after having been reflected by the plane mirror 8 crosses a narrow airgap 14 (of the order of a few microns) between the sleeve 10 and the drum 7 which can be compared to an imperfect parallel-faced slide, which shifts the spot by a few microns in depth and laterally; it is therefore necessary that the gap be of practically constant thickness, which imposes exceedingly close tolerances on the concentricities of the drum 7 and the sleeve 10.

The negative or film 9 being in contact contact with the sleeve 10, everything goes on as though the analysis of the film were being made inside the sleeve; if $n$ is the refractive index of the glass of the sleeve, the dimensions of the scanning spot and the diffraction dot are decreased in the ratio of $1/n$.

In the analysis of negatives, the optical system focuses the light rays onto the photomultiplier. It is not possible to condense all of the light rays with a single converging lens. Hence the optical system is constituted, as conventional with spherical or elliptical mirrors or by a bundle of optical filaments so arranged that the light from the spot is received by a large number of fibers so as not to introduce any parasitic modulation.

The drum 7 and sleeve 10 have very close tolerances, of the order of a few microns, with respect to their concentricities for the reason explained hereinbefore.

The drum 7 is constituted by the transparent front portion 6, e.g. made of glass and a rear portion 15 which can be transparent or solid. If solid, e.g. made of metal, it must have a coefficient of expansion very close to that of the glass of the front portion, since the plane mirror 8 must remain rigid without any outstanding flaws.

The drum further comprises a front lens element 16. When the components of the drum are made of glass, they are joined by a transparent adhesive, e.g. Araldite. For driving the drum by motor 11 a metal cap is adhesively secured on the rear end of portion 15 and is drivingly coupled to the output shaft of motor 11.

The sleeve 10, which may be made of glass, is sufficiently thick i.e. of the order of a few millimeters to withstand the forces arising from its displacement as the forces necessary for keeping the film taut.

In FIG. 2 the sleeve is mounted on the drum by means of a pneumatic bearing constituted by a thin film of air produced by the provision at each end of the sleeve of an air supply 17, 18. It is necessary to provide symmetrical ducts 19, 20 at the two ends of the sleeve and the ducts open into annular chambers 21, 22 which lead to radial and annular passages 23, 24 from which air under pressure will form the airgap 14. Any metal parts in contact with the glass are of silver.

The motor 11 which drives drum 7 in rotation has to be very uniform in speed and must start instantaneously: the type of motor best fitted to such requirements is the hysteresis, synchronous motor. The torque of such a motor increases uniformly up to the synchronous speed at which it levels off. If the resisting torque is always less than the driving torque, the motor starts instantaneously and fixes its speed at the synchronous speed.

A pair of prestressed bearings are mounted on the drum. Even with high-precision bearings, there can still be about 2 microns difference from one to the other, which in view of the length of the drum may generate too great a shimmy at the other end. It is therefore necessary to fix the bearings onto the glass with a flexible adhesive. The pair of prestressed bearings may be replaced by a double air buffer pneumatic bearing unit.

During each cycle of 360° rotation of drum 7 the sleeve advances by the length of a line (a few microns). For this purpose, motor 12 drives an extremely accurate traverse lead screw of mechanism 13 which causes the sleeve to advance or retreat. The motor must have very low inertia.

The motor 12 may be a step-by-step motor. It is driven from a synchronous hysteresis motor by a photoelectric cell device, an annular counter allowing the successive feeding of each line from the step-by-step variable-speed motor.

What is claimed is:

1. A scanning system comprising an illumination source, an optical system on the axis of said source for focusing light rays from said source, a plane mirror disposed in the path of said rays on said axis at an angle of 45° for radial reflection of the light rays, a rotatable drum carrying said mirror, said drum including a transparent front portion facing the optical system and having a rear face inclined at an angle of 45° with respect to said axis, said mirror being mounted at said rear face, means for rotating said drum and mirror about said axis, a transparent cylindrical sleeve coaxially encircling said drum and mirror and extending coaxially of the axis of rotation thereof, means for producing a gas cushion between the drum and sleeve to facilitate relative travel therebetween, said sleeve being adapted for the support of a wound film thereon, and means for producing relative axial displacement of the sleeve and mirror for illumination of successive lines on the film.

2. A system as claimed in claim 1 wherein said means for producing relative displacement of the sleeve and mirror comprises a motor coupled to the sleeve to drive the same with axial displacement.

3. A system as claimed in claim 2 wherein the means to produce the gas cushion comprises pneumatic bearings between the sleeve and drum.

4. A system as claimed in claim 3, wherein said means for producing relative displacement of the sleeve and mirror comprises means coupled to said motor to effect stepwise drive of the sleeve after each rotation of the mirror.

5. A system as claimed in claim 4 wherein said drum comprises a rear portion having a front face inclined at an angle of 450° relative to said axis, said mirror being sandwiched between the rear face of the front portion and the front face of the rear portion.

6. A system as claimed in claim 5 comprising an optical element on the front face of the front portion of the drum.

* * * * *